March 22, 1960 G. J. NOVAK 2,929,279
ASSEMBLY APPARATUS
Filed Oct. 10, 1958 3 Sheets-Sheet 1
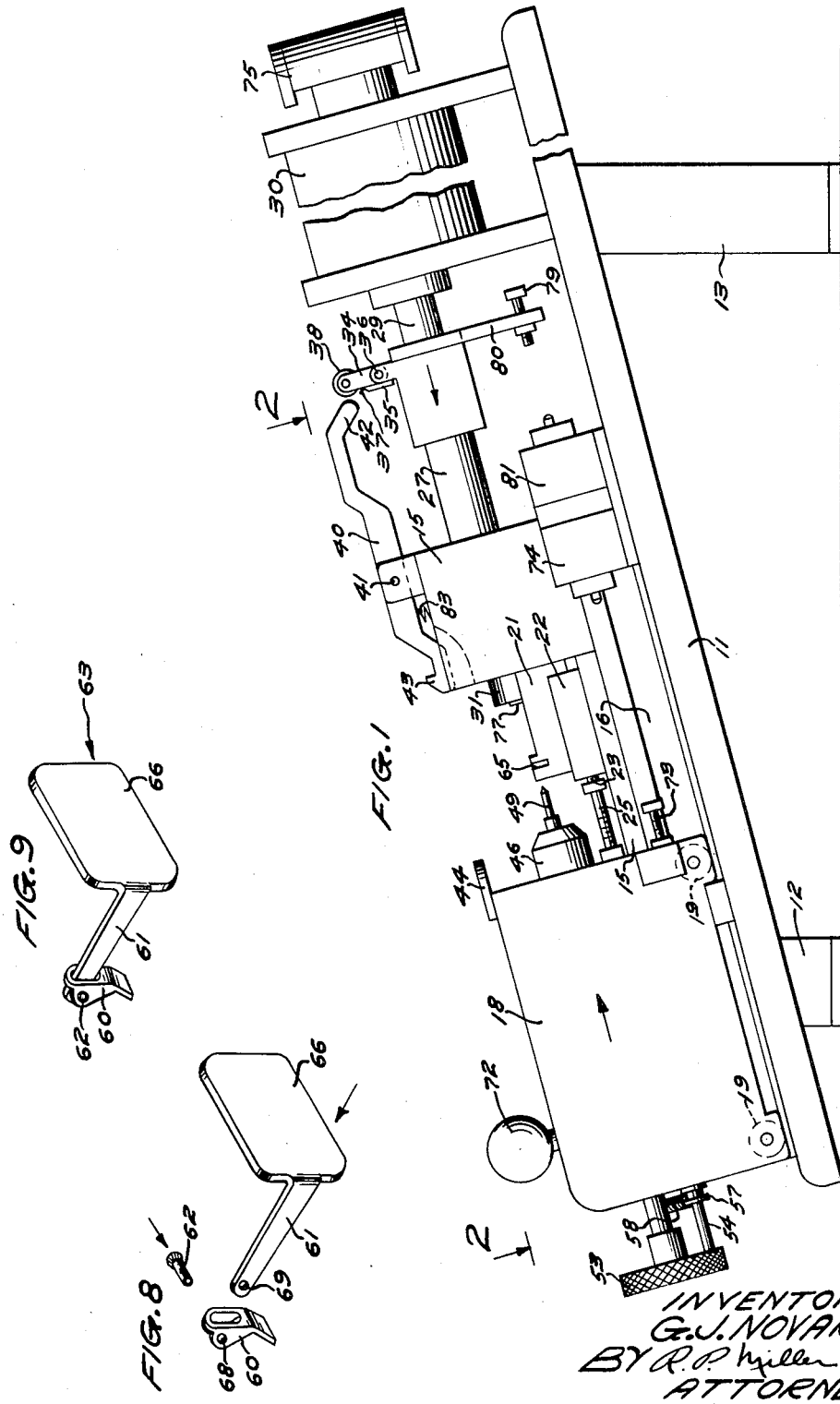
INVENTOR
G.J.NOVAK
BY R.P.Miller
ATTORNEY

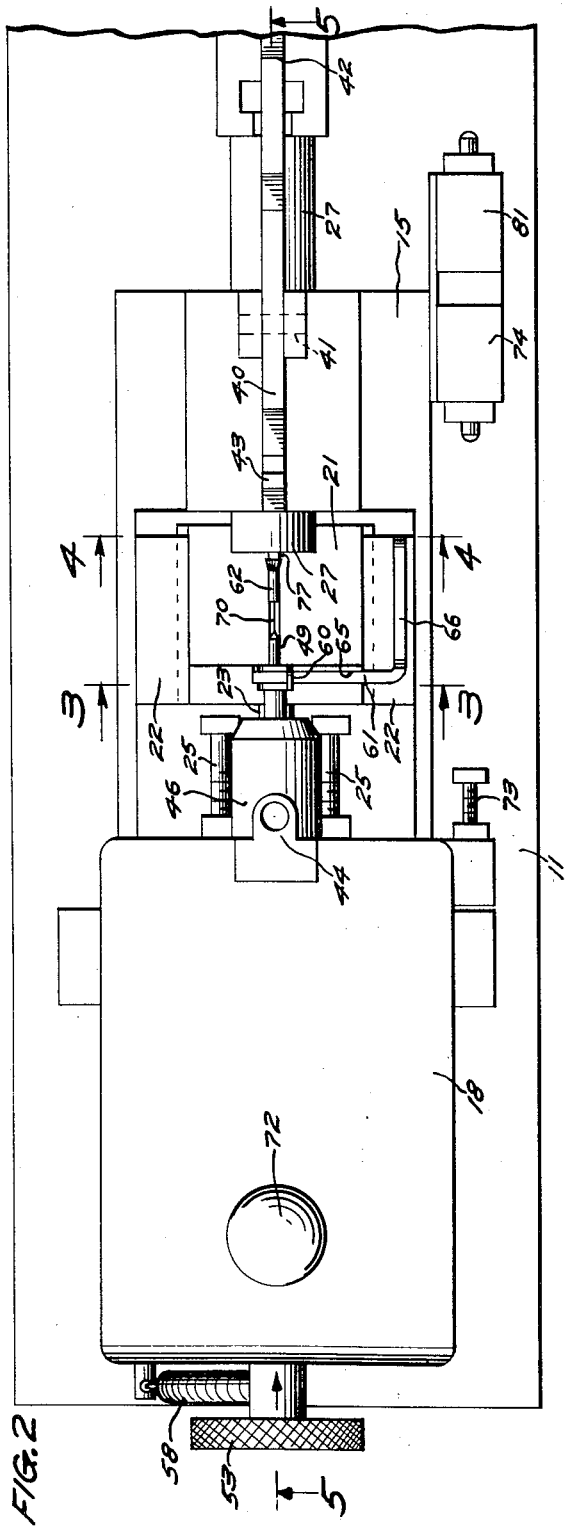

March 22, 1960
G. J. NOVAK
2,929,279
ASSEMBLY APPARATUS
Filed Oct. 10, 1958
3 Sheets-Sheet 3
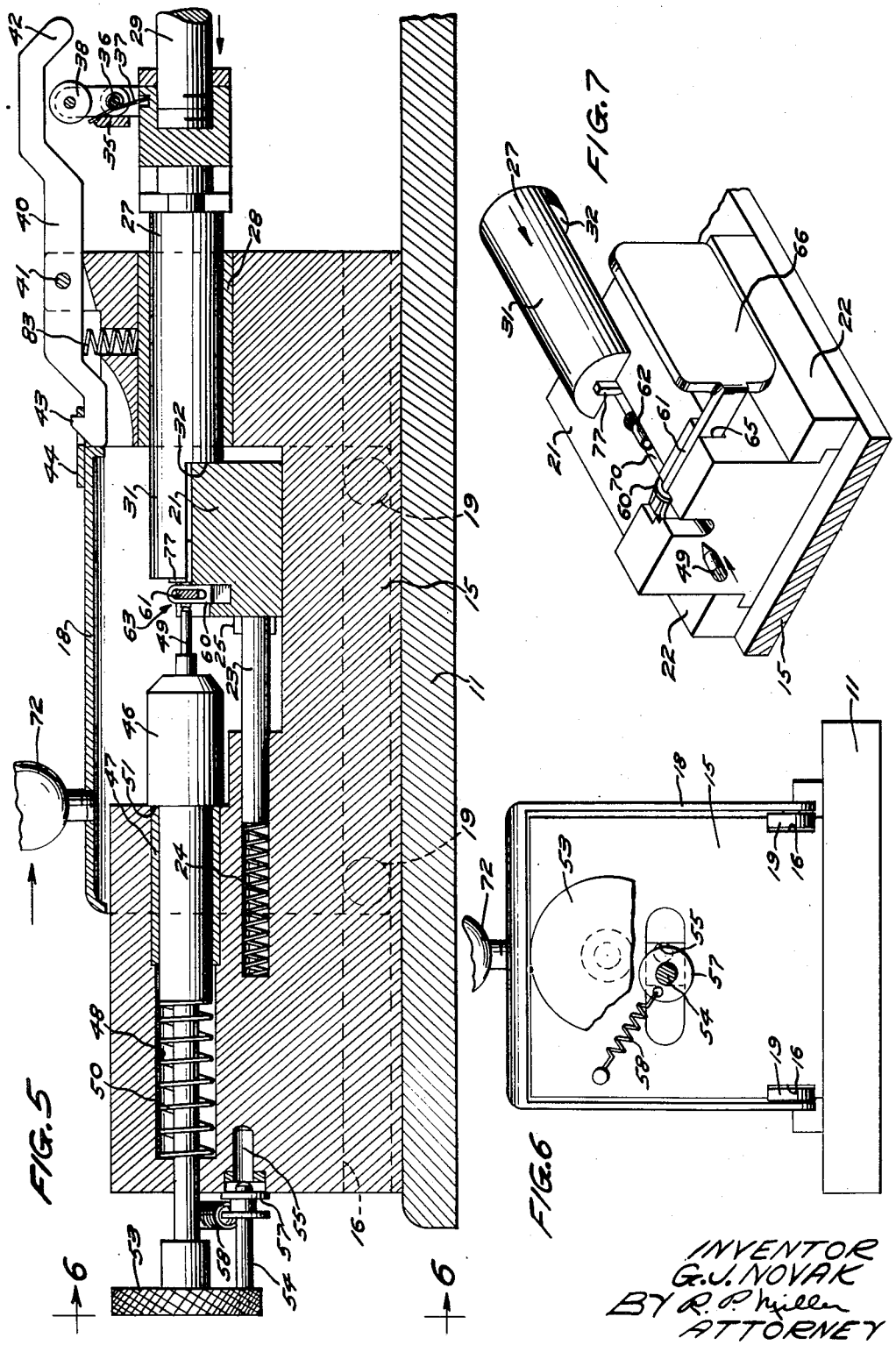
INVENTOR
G. J. NOVAK
BY R. P. Miller
ATTORNEY

United States Patent Office 2,929,279
Patented Mar. 22, 1960

2,929,279

ASSEMBLY APPARATUS

George J. Novak, Riverside, Ill., assignor to Western Electric Company, Incorporated, New York, N.Y., a corporation of New York Application October 10, 1958, Serial No. 766,518

12 Claims. (Cl. 78—1)

This invention relates to assembly apparatus and more particularly to an apparatus for staking pivot pins within apertures formed in articles whereby the articles are interconnected in pivotal relationship.

It is a primary object of this invention to provide new and improved assembly apparatus.

It is another object of this invention to provide an apparatus for automatically staking pivot pins.

It is a further object of this invention to provide an apparatus which will insert and stake pivot pins within apertures formed in articles which are to be pivotally interconnected.

It is yet another object of this invention to provide an apparatus which will automatically align apertures formed in articles to facilitate insertion of pivot pins therein.

It is a still further object of this invention to provide an automatic staking apparatus which will cycle only when a safety cover or hood has been properly positioned over the working parts of the apparatus.

With these and other objects in view, the present invention contemplates a slide provided with recesses for receiving the parts to be assembled with the apertures formed therein in approximate axial alignment, and a spring-loaded aligning and staking pin. A suitable mechanism is provided to permit the staking pin to move into the apertures in the parts to be assembled whereby exact axial alignment thereof is obtained. An air-operated ram is provided to push a pivot pin against the staking pin to displace the staking pin until the pivot pin is positioned within the apertures in the parts which are to be assembled. A stop is provided to limit the retrograde movement of the staking pin at this point so that a slight further movement of the ram causes the ram and staking pin to cooperate to stake the pivot pin within the apertures. A hood movably mounted on an inclined guideway is moved over the staking pin, slide and ram and latched in this position to initiate each cycle of operation. The ram carries a release which disengages the latch upon withdrawal of the ram to permit the hood to slide down the inclined guideway and expose the completed assembly.

Other objects, advantages and novel features of the invention will become apparent upon consideration of the following detailed description in conjunction with the accompanying drawings wherein:

Fig. 1 is a side elevation view of an assembly apparatus embodying the principal features of the present invention;

Fig. 2 is a top plan view taken along the line 2—2 of Fig. 1;

Fig. 3 is a sectional view taken along the line 3—3 of Fig. 2 and illustrates the manner in which parts to be assembled are supported in approximate axial alignment on a slide;

Fig. 4 is a sectional view taken along the line 4—4 of Fig. 2 and illustrates a ram which is adapted to push a pivot pin along a V-shaped slot formed in the top of the slide;

Fig. 5 is a sectional view taken along the line 5—5 of Fig. 2 and illustrates the various parts of the apparatus in the positions they occupy upon completion of a staking operation;

Fig. 6 is an end view taken along the line 6—6 of Fig. 5 and illustrates a cocking mechanism for an aligning and staking pin;

Fig. 7 is a perspective view of the slide illustrating the positions occupied by the parts to be assembled at the beginning of a staking operation;

Fig. 8 is a perspective view of typical parts which may be assembled with the present invention; and Fig. 9 is a perspective view of the parts illustrated in Fig. 8 upon completion of the assembly operation.

Attention now is directed to the drawings wherein like numerals of reference designate like parts throughout the several views and wherein is disclosed a base 11 which is supported at an angle to the horizontal by a short leg 12 (Fig. 1) and a long leg 13. A guide block 15 (Fig. 5) is secured to the base 11 and is provided with a pair of guideways 16 on opposite sides thereof. A safety hood 18 fits over the guide block 15 and is provided with four rollers 19 which ride within the guideways 16 to permit movement of the hood 18 longitudinally of the apparatus.

A slide 21 is mounted within a cutout portion of the block 15 and is limited to reciprocatory movement within the cutout portion by means of guides 22. A spring-biased plunger 23 is mounted within an aperture 24 formed in the block 15 and bears against one end of the slide 21 to normally urge the slide to the right as viewed in Fig. 5. A pair of stop screws 25 (Fig. 2) is threaded into the block 15 on either side of the plunger 23 and serve to limit the leftward movement of the slide 21. The amount of movement permitted the slide 21 may be varied by changing the positions of the screws 25.

A ram 27 (Fig. 5) is slidably mounted in a bushing 28 which is secured within the block 15. The ram 27 is connected to a piston rod 29 of a pneumatic cylinder 30 (Fig. 1). The ram 27 is provided with a reduced portion 31 which is slidable along the top of the slide 21. Adjacent the portion 31 on the ram 27 is a shoulder 32 which is adapted to engage the slide 21 and move it along between the guides 22.

The piston rod 29 also carries a latch release arm 34 which is pivotally mounted on a bracket 35 by means of a pivot pin 36. A single turn torsion spring 37 is secured to the arm 34 and normally urges the arm 34 in a counterclockwise direction and into abutting relationship with the bracket 35 as shown in Fig. 5. The arm 34 pivotally mounts a latch release roller 38.

A latch 40 is pivotally mounted on the block 15 by means of a pivot pin 41. One extremity of the latch 40 is provided with a depending portion 42 which is disposed in the path of movement of the roller 38. The opposite extremity of the latch 40 is provided with a hook-shaped extremity 43 which is adapted to engage an apertured latching member 44 secured to the top of the hood 18.

A plunger 46 is slidably mounted in a bushing 47 which is secured within an aperture 48 formed in the left-hand end of the block 15. A combined aligning and staking pin 49 is carried by one extremity of the plunger 46. A compression spring 50 is positioned within the aperture 48 and normally urges the plunger 46 to the right as viewed in Fig. 5. The plunger 46 is provided with an enlarged portion which forms a shoulder 51 that serves to limit the movement of the plunger to the left as viewed in Fig. 5.

A cocking knob 53 is secured to the outer extremity of the plunger 46. The knob 53 carries a pin 54 which is adapted to enter a blind recess 55 when the knob has been rotated to axially align the pin 54 with the recess 55. Alignment of the pin 54 and recess 55 permits the compression spring 50 to move the plunger 46 to the right as viewed in Fig. 5. The pin 54 is provided with a collar 57. A tension spring 58 is connected to the block 15 and the collar 57 to normally urge the collar 57 to the left as viewed in Fig. 6, whereby the pin 54 is held out of alignment with the recess 55.

Operation

In order that a better understanding of the invention may be had, its mode of operation will now be described. The function of the disclosed embodiment is to pivotally mount an armature 60 (Fig. 8) on the extremity of an armature bracket 61 by means of a recessed pivot pin 62 to form a completed assembly 63, as shown in Fig. 9. The armature 60 is first placed in a recess 64 (Fig. 3) formed in the slide 21. The recess 64 is so formed that it holds the armature 60 in a substantially upright position. The armature bracket 61 is then placed in a slot 65 formed in the slide 21 so that the extremity of the bracket 61 projects into the opening formed in the armature 60 (Fig. 7). An enlarged portion 66 of the bracket 61 rests on top of one of the guides 22. With the parts positioned thus, apertures 68 and 69 (Fig. 8) formed in the armature 60 and armature bracket 61, respectively, are in a position of approximate axial alignment. The pivot pin 62 is then placed in a V-shaped slot 70 (Fig. 4) formed in the top surface of the slide 21. The parts are then positioned as best illustrated in Fig. 7.

The knob 53 is then rotated in a counterclockwise direction, against the urging of the tension spring 58, until the pin 54 has been axially aligned with the recess 55. When alignment of the pin 54 and recess 55 occurs, the compression spring 50 begins moving the plunger 46 to the right, as viewed in Fig. 5. This movement of the plunger 46 causes the pointed tip of the pin 49 to enter the apertures 68 and 69 and then move into the slot 70. When the movement of the plunger 46 has been completed, the apertures in the armature 60 and armature bracket 61 are in a position of exact axial alignment due to the presence therein of the pin 49. The position of the parts at this time is best illustrated in Fig. 2.

A handle 72 secured to the cover of the hood 18 is then used to move the hood to the right, as shown in Figs. 1, 2 and 5, until the latching member 44 is engaged and held by the extremity 43. As the hood 18 reaches this position, an actuator screw 73, carried by the hood 18, trips a microswitch 74 to energize a double acting solenoid valve 75 which applies air to the right-hand end of the pneumatic cylinder 30. This causes the piston rod 29 and the ram 27 to begin moving to the left as viewed in Fig. 1. As the piston rod 29 moves to the left, the roller 38 engages the depending portion 42 formed on the latch 40. This causes the arm 34 to pivot in a clockwise direction about the pin 36 since the arm 34 is free to pivot in this direction. After the roller 38 has cleared the projection 42, the torsion spring 37 causes the arm 34 to re-assume the position shown in Fig. 5.

As the ram 27 moves to the left, a tip 77 formed on the end of the reduced portion 31 engages the recess formed in the pivot pin 62 and causes the pivot pin to slide along the slot 70 and into contact with the extremity of the staking pin 49. Continued movement of the ram 27 then causes the plunger 46 and the staking pin 49 to begin moving to the left, as viewed in Fig. 5, against the urging of the compression spring 50. At this time, the slide 21 is motionless so that the effect of this portion of the movement of the ram 27 is to displace the staking pin 49 from within the apertures 68 and 69 and to push the pivot pin 62 into the apertures.

The shoulder 32 is so positioned relative to the tip 77 that the shoulder will engage the slide 21 when the pivot pin 62 is centrally disposed within the apertures 68 and 69 with approximately equal amounts of the pivot pin projecting on either side. Thus, further movement of the ram 27 causes the slide 21 to move in unison with the reduced portion 31. Shortly after the slide 21 has begun to move under the influence of the ram 27, the shoulder 51 formed on the plunger 46 engages the left-hand end of the block 15 which precludes further movement of the plunger 46. The pin 54 has cleared the recess 55 at this point and the tension spring 58 acting on the collar 57 pulls the pin out of alignment with the recess to preclude movement of the plunger 46 under the influence of the spring 50 until the knob 53 is again turned to re-align the pin 54 with the recess 55.

After the shoulder 51 has engaged the block 15 to preclude further movement of the plunger 46 and staking pin 49, the ram 27 completes its stroke with a slight additional movement which is terminated when the slide 21 engages the screws 25. Since the staking pin 49 stops moving shortly before the ram 27 completes its stroke, the tip 77 forces the pivot pin against the tip of the staking pin 49 which flares the end of the pin 62 and thus stakes the pivot pin in position.

As the ram 27 completes its stroke, an adjustable screw 79 (Fig. 1), mounted on the piston rod 29 by means of a bracket 80, trips a microswitch 81 which reverses the solenoid valve 75 and applies air to the left-hand end of the pneumatic cylinder 30. This causes the piston rod 29 to begin moving the ram 27 to the right. As the piston rod 29 moves to the right, the roller 38 again engages the depending portion 42 on the latch 40. This causes the projection 42 to be elevated since the arm 34 is precluded from counterclockwise movement by the bracket 35. Elevation of the projection 42 causes the latch 40 to rotate about the pivot pin 41 against the urging of a compression spring 83. This depresses the hook-shaped extremity 43 until it is clear of the latching member 44 secured to the top of the hood 18. When the latching member 44 is released, the hood 18 rolls down the inclined guideways 16 until it reaches the position shown in Fig. 1. After the roller 38 has cleared the projection 42, the spring 83 returns the latch 40 to the position shown in Figs. 1 and 5.

As the ram 27 is withdrawn, the shoulder 32 no longer bears against the slide 21. The spring-biased plunger 23 then moves the slide 21 to the right until it engages the right-hand upright portion of the block 15. The components of the apparatus assume the positions shown in Fig. 1 upon the completion of the aforedescribed movements and the completed assembly 63 is then exposed for removal. Upon removal of the completed assembly 63 from the apparatus, the apparatus is then conditioned for the next cycle which may be performed in the manner described above.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. An apparatus for assembling articles in pivotal relationship comprising means for supporting the articles to approximately align apertures formed in the articles, said supporting means being adapted to hold a pivot pin in register with the apertures, a reciprocably mounted spring loaded staking pin, means for moving said staking pin through the apertures, means for moving the pivot pin into the apertures against the urging of the staking pin spring to displace said staking pin, and means for limiting the retrograde movement of said staking pin whereby said staking pin and said pivot pin moving means cooperate to stake the pivot pin within the aligned apertures.

2. An apparatus for assembling articles having apertures formed therein in pivotal relationship comprising means for supporting the articles and a pivot pin in approximate axial registry, a reciprocably mounted spring biased aligning plunger for deforming one end of the pivot pin, means for moving said plunger through the apertures and into engagement with the pivot pin, means for pushing the pivot pin against said spring biased aligning plunger to position the pivot pin within the apertures, and means for limiting the rearward movement of said plunger whereby said plunger and said pushing means cooperate to stake the pivot pin within the aligned apertures.

3. An apparatus for assembling articles having apertures formed therein in pivotal relationship comprising a slide for supporting the articles and a pivot pin in approximate axial registry, a reciprocably mounted spring loaded staking pin, means for moving said staking pin through the apertures and into engagement with the pivot pin, a ram for pushing said staking pin back through the apertures to position the pivot pin therein, means mounted on said ram for moving said slide articles together with the pivot pin after the pivot pin has entered the apertures, and means for stopping the retrograde movement of said staking pin before the completion of the ram stroke whereby said staking pin and said ram cooperate to stake the pivot pin within the apertures in the articles.

4. An apparatus for assembling articles having apertures formed therein in pivotal relationship comprising a base, a slide movably mounted on said base, said slide being provided with recesses adapted to support the articles and a pivot pin in approximate axial registry, a reciprocably mounted spring loaded aligning plunger, means for moving said plunger through the apertures to provide exact axial alignment, a ram for pushing the pivot pin against said plunger and the urging of the plunger spring to position the pivot pin within the apertures, said ram being adapted to move said slide and the articles together with the pivot pin after the pivot pin has entered the apertures, and means for limiting the rearward movement of said plunger prior to completion of the ram stroke whereby said plunger and said ram cooperate to stake the pivot pin within the apertures in the articles.

5. An apparatus for assembling a part in an aperture formed in an article which comprises a base having a bore formed therein, a fixture mounted on the base for holding a part in alignment with an aperture formed in an article, a staking tool slidably and rotatably mounted in the base, a first spring urging the staking tool to slide within the aperture in the article, a pin connected to the staking tool and slidable within the bore to permit the first spring to position the staking tool within the aperture in the article, said pin in the bore being effective to preclude rotation of the staking tool, a second spring urging the staking tool to rotate, and means mounted on the base for moving the part through the aperture in the article to move the staking tool against the first spring and move the pin from the bore to render the second spring effective to rotate the staking tool.

6. In an assembling apparatus, an inclined base, an assembly mechanism on said base, means for operating said assembly mechanism, a hood mounted for movement up and along said inclined base to cover said assembly mechanism, a latch for holding said hood over the assembly mechanism, means actuated by the movement of the hood over the assembly mechanism for operating said assembly mechanism operating means, and means actuated by the operation of said assembly mechanism for releasing said latch to permit the hood to move down said inclined base.

7. In an automatic machine for assembly a pin through apertures formed in a pair of articles, means for supporting said articles to approximately align the apertures in said articles, means for supporting a pin in register with said aligned apertures, a cocked spring loaded plunger, means for moving said plunger through said apertures, an inserting rod positioned in alignment with the supported pin, means to advance the inserting rod to move the pin into the apertures and against the spring loaded plunger, means for limiting movement of the spring loaded plunger whereby said inserting rod stakes the pin within the apertures, an inclined guideway spanning said plunger and rod, a hood slidably mounted on said guideway to cover said plunger and move over said support means, and means actuated by said hood moving over said support means for operating said inserting rod advancing means.

8. An apparatus for assembling articles in pivotal relationship comprising means for supporting the articles to approximately align apertures formed in the articles, said supporting means being adapted to hold a pivot pin in register with the apertures, a reciprocably mounted spring biased staking pin, means for moving said staking pin through the apertures, means for moving the pivot pin into the apertures against the urging of the staking pin spring to displace said staking pin, an inclined guideway, a hood slidably mounted on said guideway to cover said staking pin and movable over said supporting means, means actuated by movement of said hood over said supporting means for operating said pivot pin moving means, a latch for holding said hood in position over said supporting means, and means for limiting the retrograde movement of said staking pin whereby said staking pin and said pivot pin moving means cooperate to stake the pivot pin within the apertures in the articles.

9. An apparatus for assembling articles having apertures formed therein in pivotal relationship comprising means for supporting the articles with the apertures therein and a pivot pin in approximate axial registry, a reciprocably mounted spring biased aligning plunger, means for moving said plunger through the apertures and into engagement with the pivot pin, means for pushing the pivot pin against said plunger and the urging of the plunger spring to displace said plunger and position the pivot pin within the apertures, an inclined guideway, a hood slidably mounted on said guideway to cover said plunger and movable over said supporting means, means actuated by movement of said hood over said supporting means for operating said pushing means, a latch for securing said hood in position over said supporting means, means for limiting the rearward movement of said plunger whereby said plunger and said pushing means cooperate to stake the pivot pin within the apertures in the articles, and means operable upon withdrawal of said pushing means for releasing said latch.

10. In an apparatus for assembling a pin into an aperture formed in an article and for staking the pin to the article, a carrier for supporting the article with the aperture aligned with a predetermined axis and for supporting the pivot pin in spaced relation to the article for movement along said axis into the aperture, mounting means for supporting said carrier for movement parallel to said axis, a staking tool supported on said mounting means in alignment with said axis and on one side of the article on said carrier, a ram supported on said mounting means on the opposite side of the article and the pin on said carrier for movement parallel to said axis and having a portion engageable with the pin and another portion engageable with said carrier, and means for actuating said ram to effect the movement of the pivot pin into the article and the movement of the carrier and the article and pin thereon relative to the staking tool to effect the staking of the pin to the article.

11. In an apparatus for assembling and staking a pivot pin in an aperture in an article, a holder for supporting the article with the aperture substantially aligned with a predetermined axis and for supporting the pivot pin for movement along said axis, mounting means for supporting said holder, a staking tool supported on said mounting means in alignment with said axis and on one side of the article on said holder, a ram supported on said mounting means on the opposite side of the article and the pivot pin on said holder for movement along said axis, and means for actuating said ram to cause the pivot pin to be moved into the article and against the staking pin to effect the staking of the pivot pin to the article.

12. In an apparatus for assembling and staking a pivot pin in an aperture in an article, a holder for supporting the article with the aperture substantially aligned with a predetermined axis and for supporting the pivot pin in spaced relation to the article and for movement along said axis, mounting means for supporting said holder for movement parallel to said axis, a staking tool supported on said mounting means on one side of the article on said holder for movement along said axis, resilient means for moving said staking tool from a predetermined retracted position through the aperture in said article for engagement with one end of the pivot pin, a ram supported on said mounting means on the opposite side of the article and the pivot pin on said holder for movement parallel to said axis and having a portion engageable with the pivot pin and having another portion engageable with said holder, and means for actuating said ram to effect the movement of the pivot pin into the article and the staking tool to its retracted position and the movement of the holder and the article and pivot pin thereon relative to the staking tool to stake the pivot pin to the article.

References Cited in the file of this patent

UNITED STATES PATENTS

| | | |
|---|---|---|
| 507,263 | Egge | Oct. 24, 1893 |
| 682,533 | Currier et al. | Sept. 10, 1901 |
| 2,228,930 | Robinson | Jan. 14, 1941 |